Figure 1:
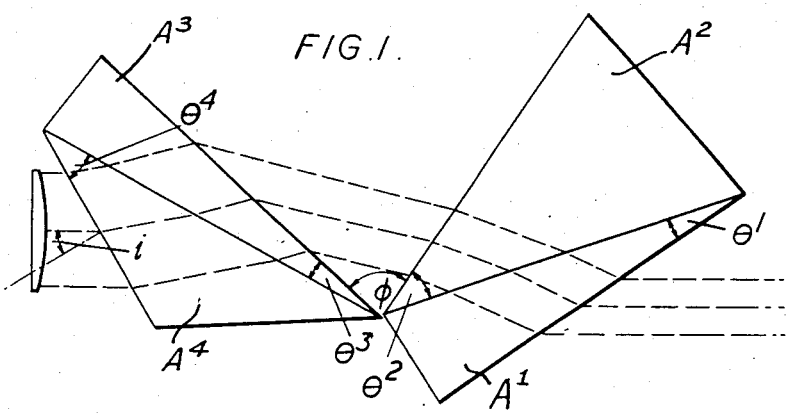

May 21, 1957     K. R. COLEMAN     2,792,751
REFRACTING COMPOUND PRISM ANAMORPHOTIC OPTICAL SYSTEMS
Filed May 10, 1954     2 Sheets—Sheet 1

Inventor
Kenneth R. Coleman
By
Attorney

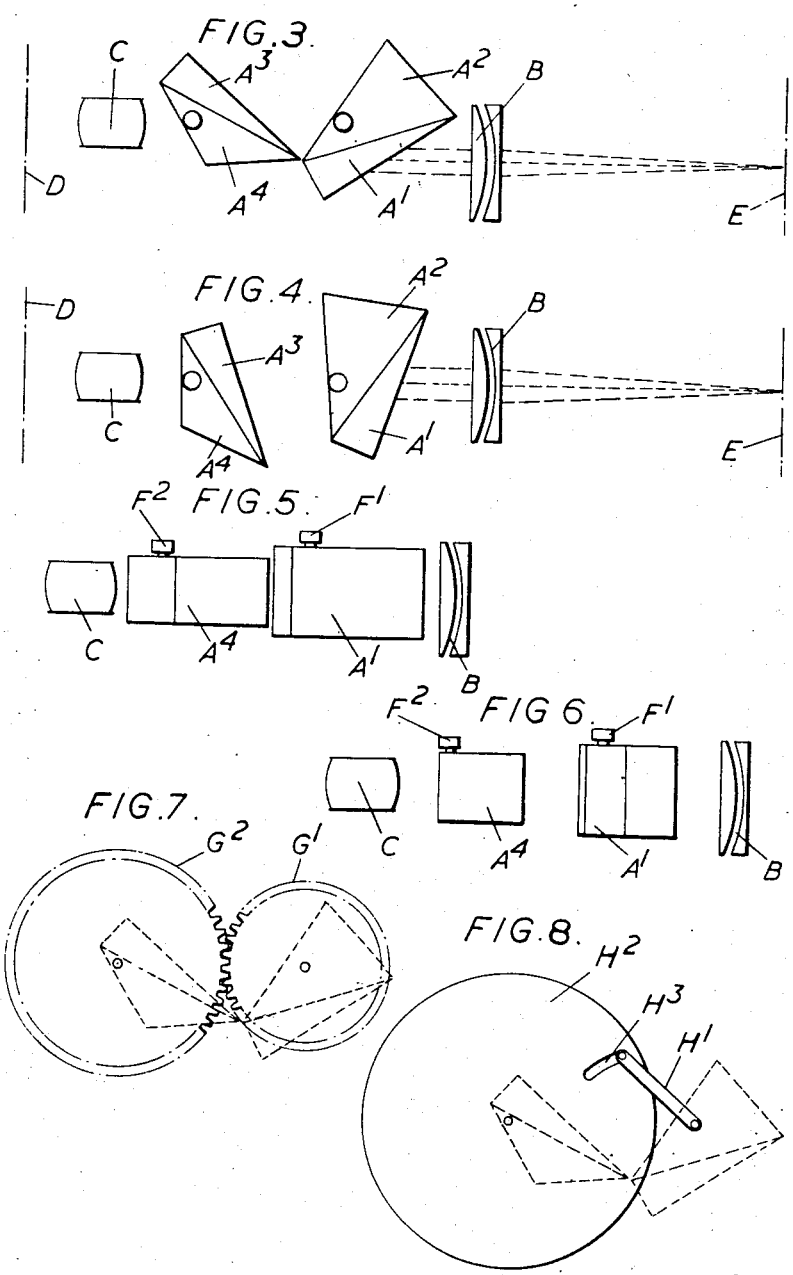

United States Patent Office 2,792,751
Patented May 21, 1957

2,792,751

REFRACTING COMPOUND PRISM ANAMOR-
PHOTIC OPTICAL SYSTEMS

Kenneth Roy Coleman, Leicester, England, assignor to
Taylor, Taylor & Hobson Limited, Leicester, England,
a British company Application May 10, 1954, Serial No. 428,616

Claims priority, application Great Britain
October 27, 1953

16 Claims. (Cl. 88—57)

This invention relates to an anamorphotic optical system comprising two refracting compound prisms each consisting of a cemented prism pair in which the two prism elements have their apices pointing in opposite directions, the arrangement being such that an incident ray will be deviated in one sense by the first compound prism and in the reverse sense by the second compound prism. The total deviation of an incident ray by such a system will depend on its angle of incidence on the first surface, and the term "axial ray" is herein used to denote a ray which emerges from the system parallel to its direction of incidence. It is to be noted that an incident collimated beam composed of axial rays will not only be deflected by the compound prism on which it is incident, but will also be reduced (or enlarged) in cross-section and this action will be repeated at the other compound prism, the reduction (or enlargement) of course taking place only in a plane at right angles to the generators of the prisms, the dimensions of the beam at right angles to such plane remaining unaltered. This change in the width of an axial collimated beam may conveniently be termed "lateral pupil compression (or enlargement)." At the same time, the angle between two oblique incident rays will be decreased (or increased) in their passage through the system, in the operative plane at right angles to the prism generators, but will remain unaltered in a plane at right angles thereto. Such change in angle may be termed "lateral angular compression (or enlargement)" and it is particularly to be noted that lateral pupil compression and lateral angular compression are operative in opposite senses, so that a beam passing through the system in one direction will suffer lateral angular compression and lateral pupil enlargement, whilst a beam passing through the system in the opposite direction will suffer lateral angular enlargement and lateral pupil compression. It will thus be clear that the system has an overall magnification factor in the operative plane equal to the reduction in width of pupil, but leaves the dimensions and direction of a beam unaltered in the plane at right angles thereto.

The present invention has for its object to provide an improved anamorphotic system of this kind, which, whilst applicable to a static arrangement giving a fixed magnification, is especially advantageous for an adjustable system in which the magnification can be varied through a relatively wide range.

The anamorphotic system according to the invention, comprises two cemented prism pairs, in each of which the two prism elements have their apices pointing in opposite directions, the apices of the two inner prism elements of the system pointing in the same direction, wherein an axial ray incident on the system from the front is deviated by the front prism pair in a sense away from the apices of the inner prism elements and by the rear prism pair in a sense towards such apices, the portion of such axial ray within each prism element being inclined to the normal to the cemented surface at an angle which exceeds by at least five degrees the angle between such ray portion and the normal to the air-exposed surface of the prism element, the Abbé V number of the material of the rear prism element of each pair exceeding that of the associated front prism element by at least 10.

Preferably, the two prism pairs are angularly adjustable about axes parallel to the prism surfaces, to vary the magnification of the system, and it is desirable in such case so to choose the relative angular movements of the two prism pairs that for an incident ray, which in one position of adjustment emerges parallel to its original direction, the deviations introduced by the rotation respectively of the two prism pairs are equal and opposite, whereby such incident ray will emerge parallel to its original direction in all positions of adjustment. The prism pairs may be so arranged that, in one position in the range of adjustment (usually that which gives greatest magnification), each prism pair is approximately achromatised.

It will often be convenient to use for the two prism elements of one pair the same materials as are used for the two prism elements of the other pair.

The anamorphotic system according to the invention is more especially intended for use with collimated light, and will usually therefore have a collimating optical system in front of it. Although applicable to various purposes, the arrangement according to the invention is especially suitable for cinematographic photography and projection, and renders it possible for example to effect lateral angular compression (without altering the vertical dimension) of the photograph of an unusually wide panoramic scene so that it can be accommodated in the ordinary picture frame area of a cinematographic film, and subsequently to effect corresponding lateral angular expansion in the projection of such film on to a wide screen.

Figure 2:
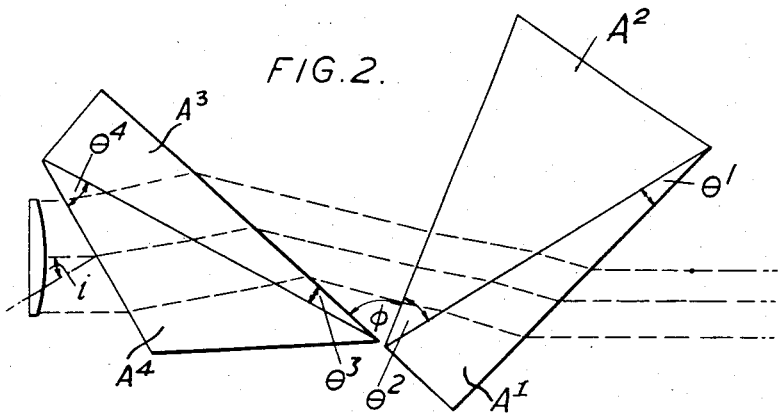

The invention may be carried into practice in various ways, but two convenient alternative examples of anamorphotic system according thereto are illustrated in the accompanying drawings, in which Figure 1 shows the arrangement of the prisms in the operative plane for the first example, Figure 2 is a similar view of the second example, Figure 3 shows the system of Figure 1, in its position of highest magnification, as used for example in conjunction with a projection objective, Figure 4 is a view similar to that of Figure 3, but showing the system in its position of lowest magnification, Figures 5 and 6 are respectively side views of the arrangements of Figures 3 and 4, and Figures 7, 8 and 9 diagrammatically illustrate three alternative forms of mechanism for inter-relating the movements of the two prism pairs.

In both examples, the apices of the two inner prism elements point in the same direction as the apex of the prismatic air space between the two prism pairs, and it will be convenient to refer to the side of the system to which such apices point as the "closed side."

Numerical data for these examples are given in the following tables. In each table, the first portion gives for each of the four prism elements, counting from the front, the apex angle $\theta$, the refractive indices $N_C$, $N_d$, $N_F$ and $N_G^1$ (respectively for the C, d, F and $G^1$ spectrum lines) of the material of which the prism element is made and also the Abbé number V of such material. The second portion of the table is concerned with angular adjustment of the prism pairs, and gives for five positions of adjustment data relating to an axial ray assumed for convenience to pass through the system from the rear to the front, such data comprising the angle of incidence $i$ (that is the angle between the incident ray and the normal to the rear surface of the rear prism pair, the incident ray being on the side of the normal remote from the closed side of the system), the angle $\phi$ between the rear surface of the front prism pair and the front surface of the rear prism pair, the overall magnification M of the system, and the angle $\Delta_{CF}$ between the emergent rays for the C and F lines of the spectrum, all the angles being given in degrees. The third portion of each table gives by way of example details of the path of one axial ray through the system, tabulating for each of the spectrum lines C, d, F and $G^1$ the angles in degrees made by the portion of the ray within each prism element with the normal to the front surface of the element and with the normal to the rear surface of the element, and also the corresponding angles in the front air space, the middle air space and the rear air space. The positive sign indicates in the case of a ray approaching the surface that the ray is on the side of the normal nearer to the closed side of the system and in the case of a ray leaving the surface that it is on the side of the normal remote from the closed side, whilst the negative sign indicates the converse condition. In the case of Example I, the fourth and fifth portions of the table give similar ray trace data for two oblique rays respectively 5.25 degrees on either side of the axial ray. These ray traces are all given, by way of example, with the prisms in the position of maximum magnification within the operating range, and for a ray passing through the system from the rear to the front. Prisms 1, 2, 3 and 4 listed in the following examples correspond to the prisms $A^1$, $A^2$, $A^3$ and $A^4$ shown on the drawings.

EXAMPLE I

|          | $\theta$ | $N_C$   | $N_d$   | $N_F$   | $N_{G^1}$ | V    |
|----------|----------|---------|---------|---------|-----------|------|
| Prism 1  | 15.83    | 1.60834 | 1.61323 | 1.62495 | 1.63502   | 36.9 |
| Prism 2  | 36.50    | 1.51637 | 1.51899 | 1.52496 | 1.52981   | 60.4 |
| Prism 3  | 13.94    | 1.60834 | 1.61323 | 1.62495 | 1.63502   | 36.9 |
| Prism 4  | 31.50    | 1.51637 | 1.51899 | 1.52496 | 1.52981   | 60.4 |

| $i$  | $\phi$ | M    | $\Delta_{CF}$ |
|------|--------|------|---------------|
| 30.2 | 83.14  | 2.02 | .0007         |
| 27.5 | 76.0   | 1.76 | .0016         |
| 25.0 | 69.2   | 1.59 | .0032         |
| 20.0 | 55.0   | 1.36 | .0076         |
| 0    | 13.0   | 1.05 | .0129         |

*Axial ray trace*

|                  | C-ray     | d-ray     | F-ray     | $G^1$-ray |
|------------------|-----------|-----------|-----------|-----------|
| Front Air Space  | +55.9334  | +55.9308  | +55.9341  | +55.9451  |
| Prism 1          | +31.0013  | +30.8959  | +30.6503  | +30.4458  |
|                  | +46.8313  | +46.7259  | +46.4803  | +46.2758  |
| Prism 2          | +50.6763  | +50.6470  | +50.5955  | +50.5677  |
|                  | +14.1763  | +14.1470  | +14.0955  | +14.0677  |
| Middle Air Space | +21.8000  | +21.7932  | +21.8012  | +21.8296  |
|                  | −61.3374  | −61.3442  | −61.3362  | −61.3078  |
| Prism 3          | −33.0635  | −32.9529  | −32.6826  | −32.4466  |
|                  | −47.0035  | −46.8929  | −46.6226  | −46.3866  |
| Prism 4          | −50.8736  | −50.8388  | −50.7601  | −50.6967  |
|                  | −19.3736  | −19.3388  | −19.2601  | −19.1967  |
| Rear Air Space   | −30.2000  | −30.2000  | −30.2000  | −30.2000  |

*Oblique ray trace +5.25*

|                  | C-ray     | d-ray     | F-ray     | $G^1$-ray |
|------------------|-----------|-----------|-----------|-----------|
| Front Air Space  | +44.9843  | +44.9867  | +45.0136  | +45.0573  |
| Prism 1          | +26.0744  | +25.9901  | +25.8018  | +25.6524  |
|                  | +41.9044  | +41.8201  | +41.6318  | +41.4824  |
| Prism 2          | +45.1047  | +45.0856  | +45.0644  | +45.0679  |
|                  | +8.6047   | +8.5856   | +8.5644   | +8.5679   |
| Middle Air Space | +13.1131  | +13.1067  | +13.1263  | +13.1743  |
|                  | −70.0243  | −70.0307  | −70.0111  | −69.9631  |
| Prism 3          | −35.7572  | −35.6340  | −35.3332  | −35.0712  |
|                  | −49.6972  | −49.5740  | −49.2732  | −49.0112  |
| Prism 4          | −53.9878  | −53.9469  | −53.8543  | −53.7796  |
|                  | −22.4878  | −22.4469  | −22.3543  | −22.2796  |
| Rear Air Space   | −35.4500  | −35.4500  | −35.4500  | −35.4500  |

*Oblique ray trace −5.25*

|                  | C-ray     | d-ray     | F-ray     | $G^1$-ray |
|------------------|-----------|-----------|-----------|-----------|
| Front Air Space  | +66.9174  | +66.9085  | +66.8853  | +66.8641  |
| Prism 1          | +34.8885  | +34.7649  | +34.4717  | +34.2236  |
|                  | +50.7185  | +50.5949  | +50.3017  | +50.0536  |
| Prism 2          | +55.1842  | +55.1463  | +55.0717  | +55.0218  |
|                  | +13.6842  | +18.6463  | +18.5717  | +18.5218  |
| Middle Air Space | +29.0631  | +29.0558  | +29.0574  | +29.0760  |
|                  | −54.0743  | −54.0816  | −54.0800  | −54.0614  |
| Prism 3          | −30.2310  | −30.1329  | −29.8926  | −29.6823  |
|                  | −44.1710  | −44.0729  | −43.8326  | −43.6223  |
| Prism 4          | −47.6517  | −47.6231  | −47.5583  | −47.5060  |
|                  | −16.1517  | −16.1231  | −16.0583  | −16.0060  |
| Rear Air Space   | −24.9500  | −24.9500  | −24.9500  | −24.9500  |

It will be noticed that in this example the same glass is used for the first and third prism elements, and the same glass likewise for the second and fourth prism elements, the Abbé V number of the latter glass exceeding that of the former by 23.5.

The useful range of magnification extends from ×2.02 to ×1.05, and it is intended that stops should be provided to limit the adjustment to this range, since outside this range the aberration corrections fall away badly or the angles of incidence with some of the surfaces become impracticably large.

It will be noticed that the values of $\Delta_{CF}$ are very small, especially at the high magnification end of the range, and in fact the two prism pairs are each approximately achromatic in the position of highest magnification.

It will be clear from the ray trace data, that for these rays the portion of an axial ray within each prism element is much more steeply inclined to the normal to the adjacent cemented surface than to the normal to the adjacent air-exposed surface, and it can be shown from similar ray trace data calculated for other positions of adjustment that this condition holds throughout the range of adjustment.

A comparison of the fourth and fifth portions of the above table will show that, for the two oblique rays in question, the angle between them at incidence on the rear surface is 10.5 degrees, whilst the angle between them on emergence from the front surface is 21.9 degrees. This illustrates the lateral angular enlargement of the system for a beam passing through it from the rear to the front, and the lateral pupil compression corresponding to the magnification ×2.02 is illustrated in Figure 1 of the drawings for collimated axial rays. The converse conditions apply to a beam passing through the system from the front to the rear, such beam suffering lateral angular compression and lateral pupil enlargement. In order to accommodate the wider angle between the oblique rays at the front, the front prism pair will usually be larger than the rear prism pair.

Turning now to the second example, this differs from the first primarily in employing different materials for the four prism elements.

EXAMPLE II

|          | $\theta$ | $N_C$   | $N_d$   | $N_F$   | $N_{G^1}$ | V    |
|----------|----------|---------|---------|---------|-----------|------|
| Prism 1  | 14.10    | 1.61546 | 1.62049 | 1.63258 | 1.64298   | 36.2 |
| Prism 2  | 36.50    | 1.50727 | 1.50970 | 1.51518 | 1.51959   | 64.4 |
| Prism 3  | 13.94    | 1.60834 | 1.61323 | 1.62495 | 1.63502   | 36.9 |
| Prism 4  | 31.50    | 1.51637 | 1.51899 | 1.52496 | 1.52982   | 60.4 |

| $i$  | $\phi$ | M    | $\Delta_{CF}$ |
|------|--------|------|---------------|
| 30.5 | 79.90  | 1.99 | .0001         |
| 27.5 | 71.00  | 1.70 | .0013         |
| 25.0 | 63.45  | 1.53 | .0054         |
| 20.0 | 46.25  | 1.30 | .0120         |
| 0    | 12.00  | 1.05 | .0100         |

*Axial ray trace*

|  | C-ray | d-ray | F-ray | G¹-ray |
|---|---|---|---|---|
| Front Air Space | +54.2286 | +54.2271 | +54.2304 | +54.2413 |
| Prism 1 | +30.1486 | +30.0447 | +29.8010 | +29.5979 |
|  | +44.2486 | +44.1447 | +44.9010 | +44.6979 |
| Prism 2 | +48.4052 | +48.3816 | +48.3434 | +48.3272 |
|  | +11.9052 | +11.8816 | +11.8434 | +11.8272 |
| Middle Air Space | +18.1158 | +18.1093 | +18.1178 | +18.1470 |
|  | −61.7842 | −61.7907 | −61.7822 | −61.7530 |
| Prism 3 | −33.2215 | −33.1101 | −32.8381 | −32.6006 |
|  | −47.1615 | −47.0501 | −46.7781 | −46.5406 |
| Prism 4 | −51.0547 | −51.0196 | −50.9401 | −50.8760 |
|  | −19.5547 | −19.5196 | −19.4401 | −19.3760 |
| Rear Air Space | −30.5000 | −30.5000 | −30.5000 | −30.5000 |

In this example, the Abbé V number of the material of the rear element in the front pair exceeds that of the associated front element by 28.2, and the corresponding excess in the rear pair is 23.5.

The values of $\Delta_{CF}$ are again very small, and the two prism pairs are each approximately achromatic at the high magnification end of the range of adjustment, which in this case extends from $\times 1.99$ to $\times 1.05$.

The portion of an axial ray within each prism element is again much more steeply inclined to the adjacent cemented surface than to the adjacent air-exposed surface, and this condition holds throughout the range of adjustment.

The anamorphotic system according to the invention is primarily intended for use in front of a main objective, with a collimating lens system in front of the attachment in order to collimate the rays passing through the system, and Figures 3 and 5 illustrate Example I so arranged. Thus, the four prism elements, counting from the front, are indicated respectively at $A^1$, $A^2$, $A^3$ and $A^4$, the collimating lens system at B, and the main objective at C. The short conjugate plane is at D, close behind the main objective C at the rear focal plane thereof, and the long conjugate plane at E, at a distance in front of the front nodal plane of the collimating lens B equal to the focal length of the collimating lens.

If the system is used for the projection on to a screen of a laterally compressed image on a cinematograph film, the film will be located in the short conjugate plane D and the screen in the long conjugate plane E, and the system will act to broaden out the laterally compressed film image to give a screen image in its normal undistorted proportions. In this case the rays will pass through the system from the rear to the front in the manner above described.

If the system is used for photographing a broad panoramic scene on to a cinematograph film, the scene to be photographed will be at or near the long conjugate plane E and the film in the short conjugate plane D, and the system will act to produce on the film a laterally compressed image of the scene, suitable for subsequent projection in the manner just described to produce a screen image in the original proportions of the panoramic scene.

Figure 9:
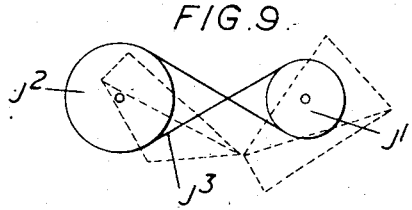

Figures 3 and 5 show Example I in its position of highest magnification within its adjustment range, that is $\times 2.02$, whilst Figures 4 and 6 show the same example in its position of lowest magnification within its range, namely $\times 1.05$. The adjustment of the two prism pairs may be controlled by two independent hand knobs, indicated respectively at $F^1$ and $F^2$, care being taken to make the two adjustments correspond appropriately to one another to ensure that an incident axial ray remains an axial ray in all positions of adjustment. If desired, however, the two hand controls may be combined together into a single control with appropriate interconnecting mechanism to ensure the correct relationship between the movements of the two prism pairs. Figure 7 indicates by way of example a simple gear mechanism, consisting of two meshing gear wheels $G^1$ and $G^2$ respectively mounted on the pivot shafts of the two prism pairs, whilst Figure 8 indicates an alternative form of interconnecting mechanism comprising an arm $H^1$ on the pivot shaft of the first prism pair and a disc $H^2$ on the pivot shaft of the second prism pair, such disc having a cam slot $H^3$ in which a pin carried by the arm $H^1$ engages. Figure 9 shows a further alternative comprising two pulleys $J^1$ and $J^2$ respectively on the pivot shafts of the two prism pairs and an endless steel tape $J^3$ wrapped round the two pulleys.

It will be clear that the arrangements shown in Figures 3–8 are just as applicable to Example II as to Example I, and also that although the system has been described as adjustable, it may if desired be held permanently fixed in any one position within the range of adjustment.

The foregoing arrangements have been more particularly described for use in giving, in the case of photography, angular compression in the horizontal plane in relation to unchanged dimensions in the vertical plane, but it will be clear that by turning them through a right angle about the optical axis they can be made to give angular compression in the vertical plane with unchanged dimensions in the horizontal plane. A somewhat similar effect can be obtained by inverting the whole anamorphotic system from end to end, so that what was the rear now becomes the front. In this case, the system would give, for photography, angular expansion in the horizontal plane with unchanged dimensions in the vertical plane. By both turning the system through a right angle about the optical axis and also inverting it from end to end, an effect similar to the original effect is obtained, that is for photography angular expansion in the vertical plane with unchanged dimensions in the horizontal plane.

What I claim as my invention and desire to secure by Letters Patent is:

1. An anamorphotic optical system, comprising two cemented refracting prism pairs in each of which the two prism elements have their apices pointing in opposite directions, the apices of the two inner prism elements pointing in the same direction as one another and in the same direction as the apex of the prismatic air space between the two prism pairs, the apex angle of the rear prism element of each pair being greater than that of the front prism element of the same pair, and the apex angle of the rear prism element of the front pair being greater than that of the rear prism element of the rear pair, wherein an axial ray incident on the system from the front is deviated by the front prism pair in a sense away from the apices of the inner prism elements and by the rear prism pair in a sense towards such apices and finally emerges parallel to its original direction of incidence, the portion of such axial ray within each prism element being inclined to the normal to the cemented surface at an angle which exceeds by at least five degrees the angle between such ray portion and the normal to the air-exposed surface of the prism element, the Abbé V number of the material of the rear prism element of each pair exceeding that of the associated front prism element by at least 10.

2. An anamorphotic optical system as claimed in claim 1, including means for angularly adjusting the two prism pairs respectively about axes parallel to the prism surfaces, thereby varying the magnification of the system.

3. An anamorphotic optical system as claimed in claim 2, in which the angular movements of the two prism pairs are inter-related by the condition that for an incident ray which in one position of adjustment emerges parallel to its original direction of incidence the deviation introduced respectively by the rotations of the two prism pairs are equal and opposite, whereby such incident ray will emerge parallel to its original direction in all positions of adjustment.

4. An anamorphotic optical system as claimed in claim 3, in which in one position in the range of adjustment each prism pair is approximately achromatic.

5. An anamorphotic optical system as claimed in claim 4, having a collimating lens system in front of the two prism pairs.

6. An anamorphotic optical system as claimed in claim 2, in which in one position in the range of adjustment each prism pair is approximately achromatic, the materials used for the two prism elements of one pair being the same as those used for the two prism elements of the other pair.

7. An anamorphotic optical system as claimed in claim 6, having a collimating lens system in front of the two prism pairs.

8. An anamorphotic optical system as claimed in claim 1, including mechanism for imparting inter-related angular adjustments to the two prism pairs about axes parallel to the prism surfaces, the relationship between the movements of the two prism pairs being such that for an incident ray which in one position of adjustment emerges parallel to its original direction of incidence the deviations introduced by the rotations respectively of the two prism pairs are equal and opposite, whereby such incident ray will emerge parallel to its original position in all positions of adjustment.

9. An anamorphotic optical system as claimed in claim 8, in which in one position in the range of adjustment each prism pair is approximately achromatic, the materials used for the two prism elements of one pair being the same as those used for the two prism elements of the other pair.

10. An anamorphotic optical system as claimed in claim 8, having a collimating lens system in front of the two prism pairs.

11. An optical system, comprising a main objective, two cemented refracting prism pairs located in front of the objective and in each of which the two prism pairs have their apices pointing in opposite directions, the apices of the two inner prism elements pointing in the same direction as one another and in the same direction as the apex of the prismatic air space between the two prism pairs, the apex angle of the rear prism element of each pair being greater than that of the front prism element of the same pair, and the apex angle of the rear prism element of the front pair being greater than that of the rear prism element of the rear pair, and a collimating lens system in front of the prism pairs, wherein an axial ray incident on the system from the front is deviated by the front prism pair in a sense away from the apices of the inner prism elements and by the rear prism pair in a sense towards such apices and finally emerges parallel to its original direction of incidence, the portion of such axial ray within each prism element being inclined to the normal to the the cemented surface at an angle which exceeds by at least five degrees the angle between such ray portion and the normal to the air-exposed surface of the prism element, the Abbé V number of the material of the rear prism element of each pair exceeding that of the associated front prism element by at least 10.

12. An optical system as claimed in claim 11, including means for angularly adjusting the two prism pairs respectively about axes parallel to the prism surfaces, thereby varying the magnification of the system.

13. An optical system as claimed in claim 12, in which the angular movements of the two prism pairs are inter-related by the condition that for an incident ray which in one position of adjustment emerges parallel to its original direction of incidence the deviations introduced respectively by the rotations of the two prism pairs are equal and opposite, whereby such incident ray will emerge parallel to its original direction in all positions of adjustment.

14. An optical system as claimed in claim 13, in which in one position in the range of adjustment each prism pair is approximately achromatic.

15. An optical system as claimed in claim 12, in which in one position in the range of adjustment each prism pair is approximately achromatic, the materials used for the two prism elements of one pair being the same as those used for the two prism elements of the other pair.

16. An optical system as claimed in claim 11, including mechanism for imparting inter-related angular adjustments to the two prism pairs about axes parallel to the prism surfaces, the relationship between the movements of the two prism pairs being such that for an incident ray which in one position of adjustment emerges parallel to its original direction of incidence the deviations introduced by the rotations respectively of the two prism pairs are equal and opposite, whereby such incident ray will emerge parallel to its original position in all positions of adjustment.

References Cited in the file of this patent

UNITED STATES PATENTS

| | | |
|---|---|---|
| 818,553 | Phillips | Apr. 24, 1906 |
| 1,307,598 | Phillips | June 24, 1919 |
| 1,758,801 | Moses | May 13, 1930 |
| 1,898,787 | Newcomer | Feb. 21, 1933 |
| 1,918,488 | Rackett | July 18, 1933 |
| 1,931,992 | Newcomer | Oct. 24, 1933 |
| 1,932,082 | Newcomer | Oct. 24, 1933 |
| 2,048,284 | Newcomer | July 21, 1936 |

FOREIGN PATENTS

| | | |
|---|---|---|
| 338,962 | Great Britain | Dec. 1, 1930 |